US010395526B1

(12) United States Patent
Slusar (10) Patent No.: US 10,395,526 B1
(45) Date of Patent: Aug. 27, 2019

(54) ROAD SEGMENT RATING BASED ON ROADWAY COMMUNICATION

(71) Applicant: Allstate Insurance Company, Northbrook, IL (US)

(72) Inventor: Mark Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 326 days.

(21) Appl. No.: 15/346,214

(22) Filed: Nov. 8, 2016

(51) Int. Cl.
*G01C 21/34* (2006.01)
*G08G 1/048* (2006.01)

(52) U.S. Cl.
CPC ......... *G08G 1/048* (2013.01); *G01C 21/3453* (2013.01)

(58) Field of Classification Search
CPC .................... G01G 1/048; G01C 21/3453
See application file for complete search history.

(56) References Cited

U.S. PATENT DOCUMENTS

| 2,849,701 | A | | 8/1958 | Clark |
| 2,922,981 | A | | 1/1960 | Anderson |
| 5,852,243 | A | * | 12/1998 | Chang ................ B60R 16/0237 73/659 |
| 6,166,658 | A | | 12/2000 | Testa |
| 6,441,748 | B1 | | 8/2002 | Takagi et al. |
| 6,693,555 | B1 | * | 2/2004 | Colmenarez ..... G08G 1/096716 340/441 |
| 6,758,089 | B2 | | 7/2004 | Breed et al. |
| 8,812,352 | B2 | * | 8/2014 | Boss ...................... G06Q 30/02 705/1.1 |
| 2004/0075582 | A1 | | 4/2004 | Bergan et al. |
| 2010/0328102 | A1 | | 12/2010 | Mattei |
| 2011/0121993 | A1 | | 5/2011 | Davis et al. |
| 2012/0209505 | A1 | | 8/2012 | Breed et al. |
| 2013/0046456 | A1 | * | 2/2013 | Scofield ............. G01C 21/3423 701/117 |
| 2014/0232561 | A1 | | 8/2014 | Musachio |
| 2014/0253345 | A1 | * | 9/2014 | Breed .............. G08G 1/096716 340/905 |

FOREIGN PATENT DOCUMENTS

CN 102542831 A 7/2012

* cited by examiner

*Primary Examiner* — Thomas Ingram
(74) *Attorney, Agent, or Firm* — Banner & Witcoff, Ltd.

(57) ABSTRACT

Methods, computer-readable media, systems and apparatuses for rating a road segment based on data received from one or more sensors distributed along the road segment. In some arrangements, a number of sensors along a road segment may be determined based on characteristics or features of the road segment. In at least some arrangements, the data received and/or processed from road segment sensors may be controlled based on current road segment conditions. For instance, in fair weather data from fewer than all sensors along a road segment may be received and/or processed because the likelihood of a dangerous condition is reduced. However, when current conditions indicate the potential for hazardous conditions (e.g., temperature near or below freezing, presence of moisture, untreated road segment, etc.) data from all sensors may be received and/or processed to ensure the most accurate information for an entire length of the road segment is obtained.

20 Claims, 7 Drawing Sheets

ROAD SEGMENT RATING BASED ON ROADWAY COMMUNICATION

TECHNICAL FIELD

Various aspects of the disclosure relate to using sensor data to evaluate road segments. More specifically, aspects of the disclosure relate to using data from sensors embedded in a road segment to evaluate and/or rate the road segment.

BACKGROUND

Being aware of changing driving conditions can aid in improving the likelihood of a safe driving experience. However, often drivers rely on weather reports or forecasts that might not be accurate in a particular area or may be delayed. Although many vehicles including sensing devices to detect changing conditions, those devices may be best suited to evaluating current conditions rather than conditions associated with a road segment that a driver is approaching. Accordingly, it may be advantageous to receive information about road segment conditions directly from sensors embedded in the road segment.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems, and apparatuses for rating a road segment based on data received from one or more sensors distributed along the road segment. In some arrangements, a number of sensors along a road segment may be determined based on characteristics or features of the road segment.

For example, in some arrangements, the system may score or rate one or more features of a road segment. An overall road segment feature rating may be determined and used to identify a number of sensors to distribute along a road segment.

In at least some arrangements, the data received and/or processed from road segment sensors may be controlled based on current road segment conditions. For instance, in fair weather data from fewer than all sensors along a road segment may be received and/or processed because the likelihood of a dangerous condition is reduced. However, when current conditions indicate the potential for hazardous conditions (e.g., temperature near or below freezing, presence of moisture, untreated road segment, etc.) data from all sensors may be received and/or processed to ensure the most accurate information for an entire length of the road segment is obtained.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
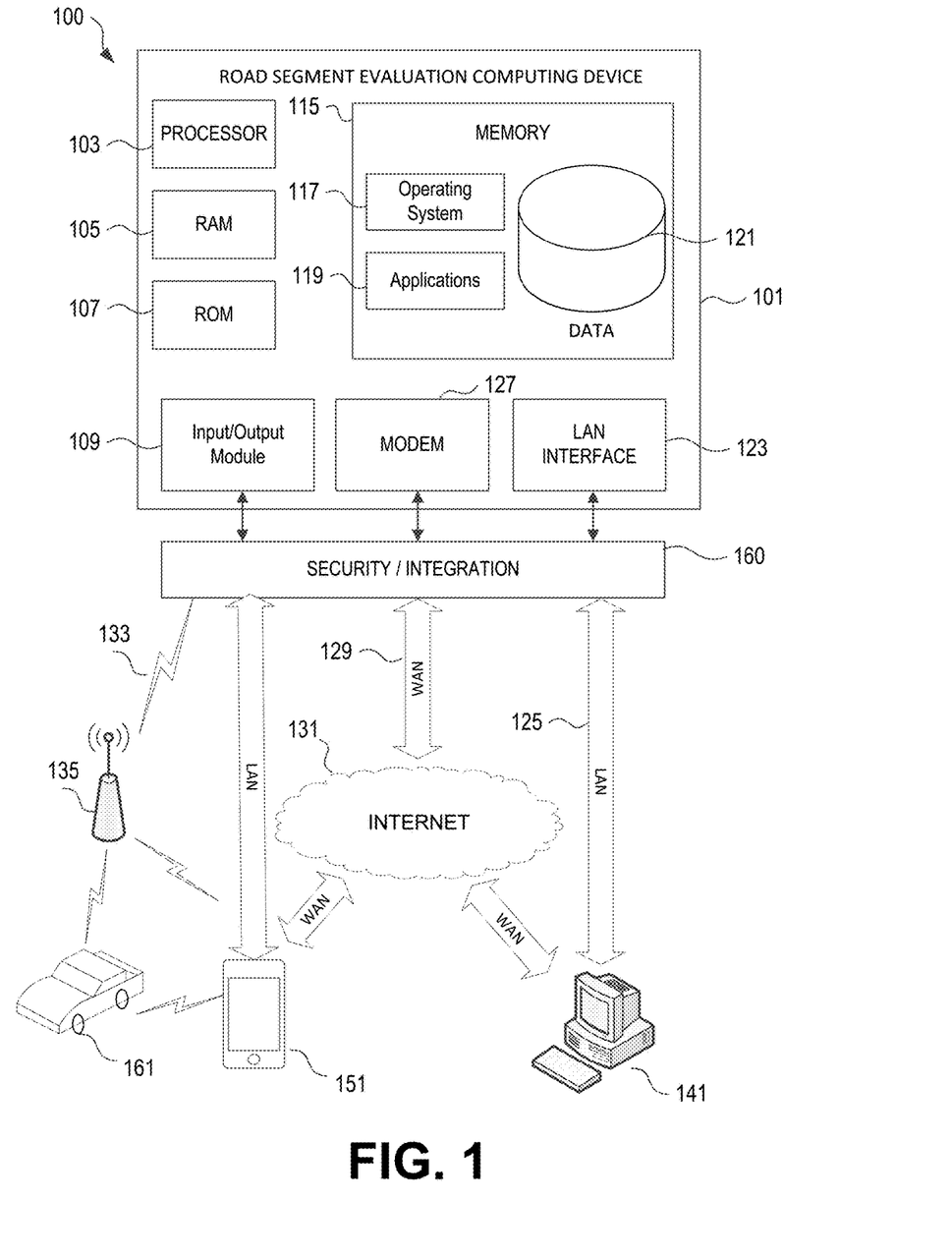
FIG. 1 illustrates computing systems and a network environment that may be used to implement aspects of the disclosure.

FIG. 1 illustrates a block diagram of one example road segment evaluation computing device (or system) 101 in a computer system 100 that may be used according to one or more illustrative embodiments of the disclosure. The road segment evaluation device 101 may have a processor 103 for controlling overall operation of the device 101 and its associated components, including RAM 105, ROM 107, input/output module 109, and memory 115. The road segment evaluation computing device 101, along with one or more additional devices (e.g., terminals 141 and 151, security and integration hardware 160) may correspond to any of multiple systems or devices described herein, such as personal mobile devices, vehicle-based computing devices, insurance systems servers, road segment evaluation servers, internal data sources, external data sources and other various devices in a road segment evaluation system. These various computing systems may be configured individually or in combination, as described herein, for receiving signals from one or more sensing devices, processing the signals to determine characteristics of a road segment, and evaluating risk associated with the road segment based on the determined characteristics, and the like, using the devices of the road segment evation systems described herein. In addition to the features described above, the techniques described herein also may be used for generating and presenting road segment risk values, proposed alternative routes or road segments, or the like, to users (e.g., via a computing device, such as an on-board vehicle computing device, mobile device, or the like).

Input/Output (I/O) 109 may include a microphone, keypad, touch screen, and/or stylus through which a user of the road segment evaluation computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within road segment evaluation systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, road segment evaluation server 101, etc.), in order to collect and analyze driver data, vehicle data, road segment sensor data, and/or driving trip data, determine characteristics of a road segment based on the received data, and/or determine a risk associated with the road segment based on the determined road segment characteristics, etc., using the various devices of the road segment evaluation systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster).

Processor(s) 103 and its associated components may allow the system 101 to execute a series of computer-readable instructions, for example, receive data from one or more sensing devices, determined road segment characteristics based on the received data, determine a road segment risk score or rating based on the determined characteristics, and the like.

The computing device (e.g., a personal mobile device, vehicle-based system, insurance system server, road segment evaluation server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the road segment evaluation computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, a road segment evaluation server, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting a cloud-based vehicle identification, vehicle and driver data retrieval and analysis, sensor data retrieval and analysis, and the like. In other examples, the security and integration layer 160 may correspond to separate hardware and software components which may be operated at a separate physical location and/or by a separate entity.

As discussed below, the data transferred to and from various devices in a road segment evaluation system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, road segment evaluation servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, driving trip data, road segment sensor data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, road segment sensor data, and/or driving trip data analysis web service, a road segment evaluation web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, driving behaviors or characteristics, passenger-related data, vehicle data, driving trip data, road segment sensor data, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of road segment evaluation systems, such as faster response times and less dependence on network conditions when transmitting and receiving driver information, vehicle information, driving trip information, road segment sensor data, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in road segment evaluation system components described herein may be configured to communicate using any of these network protocols or technologies.

Additionally, one or more application programs 119 may be used by the various computing devices 101 within a road segment evaluation system 100 (e.g., vehicle data, driver data, road segment sensor data, and/or driving trip data analysis software applications, road segment evaluation software applications, etc.), including computer executable instructions for receiving and analyzing various driver data, vehicle data, road segment sensor data, and/or driving trip data, determining road segment characteristics, determining road segment risk based on the road segment characteristics, determining a number of sensors to distribute in a particular road segment, and/or determining alternate road segments or routes to provide to a user.

Figure 2:
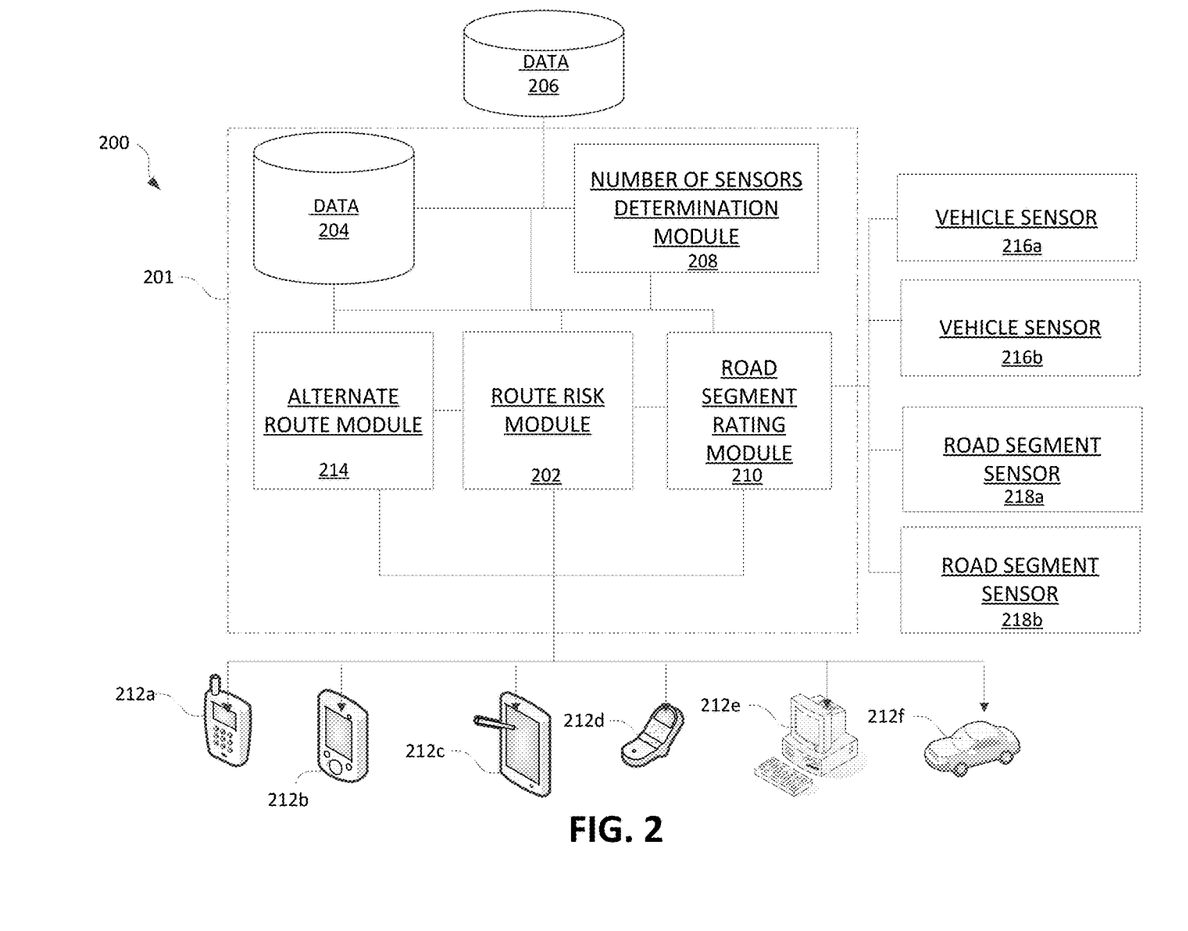
FIG. 2 is an example road segment evaluation system according to one or more aspects described herein.

FIG. 2 is a schematic diagram of an illustrative road segment evaluation system 200. The road segment evaluation system 200 may be associated with, internal to, operated by, or the like, an entity 201, such as an insurance provider. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The road segment evaluation system 200 may include one or more modules that may include hardware and/or software configured to perform various functions within the system 200. The one or more modules may be separate, physical devices or, in other examples, one or more modules may be part of the same physical device.

The road segment evaluation system may include a road segment risk module 202. The road segment risk module 202 may include hardware and/or software configured to receive electronic signals from one or more sensing devices (such as sensors 216a, 216b, 218a, 218b) and determine a road segment risk rating for a particular road segment. In some arrangements, the road segment risk module 202 may also receive data from one or more data stores 204, 206. The data store may be internal to or associated with the entity, such as data store 204, or may be external to the entity, such as data store 206. In some arrangements, the data stores 204, 206 may include publicly available information and/or non-public information.

In some examples, data stores 204, 206 may store information related to one or more road segments. A road segment may include a road, portion of a road, bridge, on-ramp, off-ramp, access road, off-road path, driveway, parking lot, parking garages or structures, or any other roadway or portion of a roadway on which vehicles may travel. In some arrangements, one or more aspects described herein may be used in garages, such as personal garages.

The data stores 204, 206 may include global positioning system data related to a location of a road segment, historical data associated with the road segment (e.g., accident data, frequency of accidents, severity of accidents, and the like), a configuration of the road segment (e.g., curved, straight, severe curve, etc.), historic weather data, speed limit data, lighting conditions along the road segment, and the like.

In some arrangements, one or more of data stores 204, 206 may store data related to driving behaviors of a user (e.g., received from a telematics device within a vehicle operated by the user, received from a mobile device of a user, etc.). One or more of data stores 204, 206 may include vehicle operational data associated with a plurality of vehicles, as well as insurance information for the plurality of vehicles, accident histories, claims data, and the like.

Various other types of data may be stored in one or more of data stores 204, 206 without departing from the invention. For instance, one or more of data stores 204, 206 may also store sensor data (e.g., electronic signals/data) received from one or more sensing devices (such as sensors 216a, 216b 218a, 218b). Sensors 216a and 216b may be vehicle based sensors that may detect various vehicle operational data, as will be discussed more fully herein. Sensors 218a, 218b may be road segment sensors configured to detect conditions along a road segment. For instance, the road segment sensors may be arranged along a road segment and may be configured to detect moisture, temperature, pressure, weight, debris in the road segment, potholes or bumps in the road segment, pedestrian traffic, salinity or other road treatment along the road segment (to indicate possible ice melting), and the like, as will be discussed more fully herein. This information may be transmitted to, for instance, road segment rating module 210 for processing, as will be discussed more fully herein.

The road segment evaluation system 200 may further include a number of sensors determination module 208. The number of sensors determination module may receive data related to a road segment (e.g., type of road (rural, urban, two lane, four lane, etc.), road segment structure (curved, straight, etc.), location of the road segment, and the like, and may determine, based on the features of the road segment, a number of sensors to distribute along the road segment. For instance, if a road segment is relatively homogenous (e.g., substantially straight, well lit, rural, etc.), fewer sensors may be distributed along the road segment (e.g., the sensors may be spaced apart more widely for a given distance of road segment than other, less homogenous road segments where sensors may be more densely packed or distributed). Alternatively, if the road segment is substantially curved, is in an area prone to icing, is dimly lit, is located in a busy urban area, etc., a greater number of sensors may be distributed along the road segment/sensors may be more closely positioned.

In some examples, a predictive model may be used to determine a number of sensors to arrange along a road segment. The predictive model may evaluate features of a roadway, historical data, and the like, to determine a number of sensors to distribute along a road segment. In another example, the system may evaluate features of the road segment and may identify another road segment having similar features. The number of sensors in the identified similar road segment may then be distributed along the road segment.

In still other examples, the number of sensors determination module 208 may receive or identify a feature score or rating for a road segment. That is, features of the road segment may be received (e.g., from historical data) and may be scored or rated. In some examples, features such as curvature, lighting, traffic volume, location, and/or accident history may each receive a score (e.g., 1 to 10, 1 to 100, etc.). The scores for each feature may be summed for the road segment and the overall road segment feature score may be used to determine a number of sensors to distribute along the road segment. For instance, if the overall road segment feature score is within a first predetermined threshold, a first number of sensors may be distributed, if the overall road segment feature score is within a second predetermined threshold, a second number of sensors (e.g., greater than the first number) may be used, if the overall road segment feature score is within a third predetermined threshold, a third number of sensors (e.g., greater than the first number and the second number) may be used.

When evaluating a number of sensors to distribute in a garage, such as a personal garage, aspects associated with determining a number of sensors to distribute may include determining whether the garage is a single car, two car, three car, or the like, and distributing a number of sensors based on the determination (e.g., a three car garage may have more sensors to detect conditions than a single car garage, etc.).

The number of features and particular features described above with respect to scoring, as well as the scoring arrangements, are merely some examples. Various other scoring arrangements and/or features, as well as more or fewer features, may be considered when evaluating a number of sensors to distribute along a road segment.

In one example in which five features of a road segment are evaluated on a scale of 1 to 10 with 10 being the riskiest, five thresholds for an overall score may be established: a first threshold may include scores between five and ten, a second threshold may include scores between 11 and 20, a third threshold may include scores between 21 and 30, a fourth threshold may include scores between 31 and 40, and a fifth threshold may include scores between 41 and 50. Each threshold may correspond to a different number of sensors for the road segment, number of sensors per meter, mile, etc. or the like. The higher the overall score, the more sensors may be used.

In some examples, the sensor data received and/or processed by the system may be controlled based on one or more conditions. For instance, although a road segment may have a fixed number of sensors detecting conditions, the system may receive data from a portion of the sensors (e.g., less than all the sensors) when certain conditions are met. For instance, if it is daylight, data might be received from less than all sensors on a road segment. If the weather is dry and clear, data may be received from less than all the sensors on the road segment. Alternatively, if it is dark and/or the weather conditions are poor, data may be received from all sensors in order to obtain as much data as possible.

In some examples, receiving data from less than all sensors may include controlling sensors transmitting data. For instance, the road segment rating module 210, or other device within the road segment evaluation system 200 may transmit an indication to one or more sensors to not transmit data until reactivated. Additionally or alternatively, the road segment rating module 210 may filter the data upon receipt. That is, data may be received from all sensors on a road segment but only data from some sensors may be processed in order to conserve resources (e.g., computing resources), streamline the processing of data, improve data processing time, etc. In some examples, a determination of whether the conditions are sufficient to receive/process data from fewer than all sensors in a road segment may be made by the road segment evaluation system (e.g., the road segment rating module 210 may receive current condition information and may determine whether conditions meet pre-stored or pre-defined criteria to receive/process data from less than all sensors).

Although road segments may vary in length, the number of sensors may be based on a particular spacing between sensors (e.g., one sensor per meter, per ⅒ of a meter, etc.). Accordingly, a greater number of sensors may include modifying a spacing between the sensors. Additionally or alternatively, the spacing of the sensors for a road segment may vary within the road segment. That is, a road segment may have a curved portion and a straight portion. The curved portion may have sensors arranged closer together than the straight portion.

As indicated above, the road segment evaluation system 200 may include a road segment rating module 210. The road segment rating module 210 may receive data from road segment sensors 218a, 218b, and/or vehicle sensors 216a, 216b, and may determine a road segment rating for the particular road segment. In some examples, historical or other data may also be used in making the determination (e.g., accident history for the road segment, etc.). The road segment rating module 210 may receive sensor data (e.g., electronic signals) and may process the signals to determine conditions associated with the road segment. In some examples, the determination may be made in real-time or near real-time. For instance, the road segment sensors 218a, 218b may detect moisture and a temperature below 32 degrees Fahrenheit. Accordingly, the road segment rating module 210 may determine that the road segment may include icy portions and may determine that a rating for the road segment is riskier than when the weather is dry and/or warmer. Once the road segment rating is determined, the information may be transmitted to one or more vehicles in the area as a warning that the road segment may be icy.

The road segment evaluation system 200 may further include a route risk module 202. The route risk module 202 may receive road segment ratings from the road segment rating module 210 and may determine an overall risk associated with a route on which a driver is travelling (e.g., as determined from a route input into, for instance, a navigation system, as determined by driving patterns, or the like). The overall risk may be determined, in at least some examples, by summing the rating of each road segment.

The road segment evaluation system 200 may further include an alternate route module 214. The alternate route module 214 may determine that an overall risk for a particular route is higher than a predetermined threshold and may generate one or more alternative routes that that may have less risk. The alternative routes may be selected based on historical data and/or based on real-time or near real-time ratings received from the road segment rating module 210.

Information may be provided to users via one or more computing devices. For instance, one or more notifications (e.g., of road conditions, alternate routes, etc.) may be transmitted to a computing device of a user, such as a smart phone 212a, personal digital assistant 212b, tablet computing device 212c, cell phone 212d, other computing device 212e, and/or an on-board vehicle computing device 212f.

Figure 3:
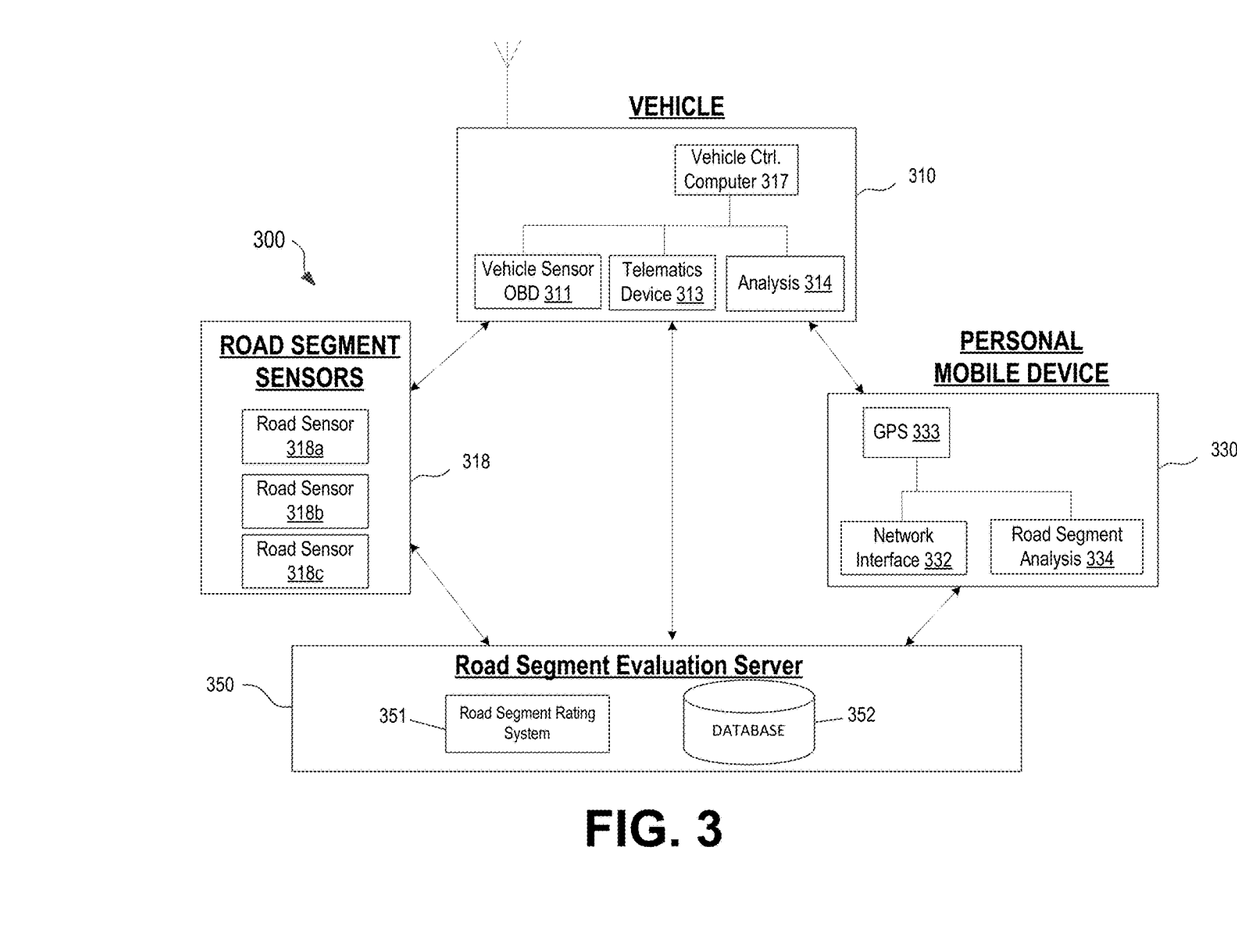
FIG. 3 is an example road segment evaluation system environment illustrating various communications between vehicles-based devices, a personal mobile device, and road segment evaluation server, according to one or more aspects of the disclosure.

FIG. 3 is a diagram of an illustrative road segment evaluation system including additional aspects not shown in the road segment evaluation system 200 of FIG. 2 and/or implementing the road segment evaluation system 200 of FIG. 2. The system 300 includes a vehicle 310, a personal mobile device 330, a road segment evaluation server 350, a plurality of road segment sensors 318, and additional related components. As discussed below, the components of the system 300, individually or using communication and collaborative interaction, may determine road segment characteristics and, based on the road segment characteristics, determine a rating for a road segment that may be indicative of a risk associated with the road segment. To perform such features, the components shown in FIG. 3 each may be implemented in hardware, software, or a combination of the two. Additionally, each component of the system 300 may include a computing device (or system) having some or all of the structural components described above for computing device 101.

Vehicle 310 in the system 300 may be, for example, an automobile, a motorcycle, a scooter, a bus, a recreational vehicle, commercial vehicle, a boat, or other vehicle for which vehicle data, location data, driver data (or operator data), operational data and/or other driving data (e.g., location data, time data, weather data, etc.) may be collected and analyzed. The vehicle 310 includes vehicle operation sensor 311 (similar to one or more of sensors 216a-216b of FIG. 2) capable of detecting and recording various conditions at the vehicle and operational parameters of the vehicle. For example, sensor 311 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 311 also may detect and store data received from the vehicle's 310 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 311 may detect and store the external driving conditions, for example, external temperature, rain, snow, light levels, and sun position for driver visibility. For example, external cameras and proximity sensors 311 may detect other nearby vehicles, vehicle spacing, traffic levels, road conditions, traffic obstructions, animals, cyclists, pedestrians, and other conditions that may factor into a driving data/behavior analysis. Sensor 311 also may detect and store data relating to moving violations and the observance of traffic signals and signs by the vehicle 310. Additional sensors 311 may detect and store data relating to the maintenance of the vehicle 310, such as the engine status, oil level, engine coolant temperature, odometer reading, the level of fuel in the fuel tank, engine revolutions per minute (RPMs), software upgrades, and/or tire pressure.

Vehicles sensor 311 also may include cameras and/or proximity sensors capable of recording additional conditions inside or outside of the vehicle 310. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 311 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 310. Sensor 311 also may be configured to collect data relating to a driver's movements or the condition of a driver. For example, vehicle 310 may include sensors that monitor a driver's movements, such as the driver's eye position and/or head position, etc. Additional sensors 311 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 311 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 311 may determine when and how often the vehicle 310 stays in a single lane or strays into other lane. A Global Positioning System (GPS), locational sensors positioned inside the vehicle 310, and/or locational sensors or devices external to the vehicle 310 may be used to determine the route, speed, lane position, road-type (e.g. highway, entrance/exit ramp, residential area, etc.) and other vehicle position/location data.

The data collected by vehicle sensor 311 (as well as road segment sensors 318) may be stored and/or analyzed within the vehicle 310, such as for example a driving/road segment analysis computer 314 integrated into the vehicle, and/or may be transmitted to one or more external devices. For example, as shown in FIG. 3, sensor data may be transmitted via a telematics device 313 to one or more remote computing devices, such as personal mobile device 330, road segment evaluation server 350, and/or other remote devices.

As shown in FIG. 3, the data collected by vehicle sensor 311 may be transmitted to road segment evaluation server 350, personal mobile device 330, and/or additional external servers and devices via telematics device 313. Telematics device 313 may be one or more computing devices containing many or all of the hardware/software components as the computing device 101 depicted in FIG. 1. As discussed above, the telematics device 313 may receive vehicle operation data and driving data from vehicle sensor 311, and may transmit the data to one or more external computer systems (e.g., road segment evaluation server 350 of an insurance company, financial institution, or other entity) over a wireless transmission network. Telematics device 313 also may be configured to detect or determine additional types of data relating to real-time driving and the condition of the vehicle 310. The telematics device 313 also may store the type of vehicle 310, for example, the make, model, trim (or submodel), year, and/or engine specifications, as well as other information such as vehicle owner or driver information, insurance information, and financing information for the vehicle 310.

In the example shown in FIG. 3, telematics device 313 may receive vehicle driving data from vehicle sensor 311, and may transmit the data to a road segment evaluation server 350. However, in other examples, one or more of the vehicle sensors 311 or systems may be configured to receive and transmit data directly from or to a road segment evaluation server 350 without using a telematics device. For instance, telematics device 313 may be configured to receive and transmit data from certain vehicle sensors 311 or systems, while other sensors or systems may be configured to directly receive and/or transmit data to a road segment evaluation server 350 without using the telematics device 313. Thus, telematics device 313 may be optional in certain embodiments.

The system 300 in FIG. 3 also includes a mobile device 330. Mobile devices 330 may be, for example, smartphones or other mobile phones, personal digital assistants (PDAs), tablet computers, and the like, and may include some or all of the elements described above with respect to the computing device 101. As shown in this example, some mobile devices in systems 300 (e.g., mobile device 330) may be configured to establish communication sessions with vehicle-based devices and various internal components of vehicle 310 via wireless networks or wired connections (e.g., for docked devices), whereby such mobile devices 330 may have secure access to internal vehicle sensors 311 and other vehicle-based systems. However, in other examples, the mobile device 330 might not connect to vehicle-based computing devices and internal components, but may operate independently by communicating with vehicle 310 via their standard communication interfaces (e.g., telematics device 313, etc.), or might not connect at all to vehicle 310.

Mobile device 330 may include a network interface 321, which may include various network interface hardware (e.g., adapters, modems, wireless transceivers, etc.) and software components to enable mobile device 330 to communicate with road segment evaluation server 350, vehicle 310, road segment sensors 318, and various other external computing devices. One or more specialized software applications, such as a road segment analysis application 334 may be stored in the memory of the mobile device 330. The road segment analysis application 334 may be received via network interface 321 from the road segment evaluation server 350, vehicle 310, or other application providers (e.g., application stores). As discussed below, the road segment analysis application 334 may or may not include various user interface screens, and may be configured to run as user-initiated applications or as background applications. The memory of the mobile device 330 also may include databases configured to receive and store vehicle data, driving data, road segment data, driving trip data, and the like, associated with one or more drivers, vehicles, and/or road segments.

Like the vehicle-based computing devices in vehicle 310, mobile device 330 also may include various components configured to generate and/or receive vehicle data, driver data, and driving data or other operational data, as well as communicate with road segment sensors 318 to obtain road segment data and/or conditions. For example, using data from the GPS receiver 333, a road segment analysis software application 334 may be able to identify starting and stopping points of driving trips, determine driving speeds, times, routes, and the like. Additional components of mobile device 330 may be used to generate or receive driving data for the road segment analysis application 334, such as an accelerometer, compass, and various cameras and proximity sensors. Additional components of the mobile device 330 may receive signals or data from road segment sensors and the road segment analysis application 334 may use this data to evaluate road segment characteristics, conditions, and the like. As discussed herein, the road segment analysis software application 334 may store and analyze the data from various mobile device components, road segment sensors, historical data, and the like, and may use this data, in conjunction with one or more other devices (e.g., road segment evaluation server 350), to determine a road segment rating, determine a route rating, and the like.

When mobile computing devices within vehicles are used to detect vehicle driving data, to receive vehicle driving data from vehicle sensors, and/or to receive data from one or more road segment sensors, such mobile computing devices 330 may store, analyze, and/or transmit the data to one or more other devices. For example, mobile computing device 330 may transmit data directly to one or more road segment evaluation servers 350, and thus may be used in conjunction with or instead of telematics devices 313. Moreover, the processing components of the mobile computing device 330 may be used to evaluate sensor data to determine road segment characteristics, determine an overall route risk rating, control sensor data received and/or processed, and perform other related functions. Therefore, in certain embodiments, mobile computing device 330 may be used in conjunction with, or in place of, the road segment evaluation server 350.

Vehicle 310 may include driving/road segment analysis computer 314, which may be separate computing devices or may be integrated into one or more other components within the vehicle 310, such as the telematics device 313, autonomous driving systems, or the internal computing systems of vehicle 310. As discussed above, driving/road segment analysis computers 314 also may be implemented by computing devices independent from the vehicle 310, such as mobile computing device 330 of the drivers or passengers, or one or more separate computer systems (e.g., a user's home or office computer). In any of these examples, the driving/road segment analysis computer 314 may contain some or all of the hardware/software components as the computing device 101 depicted in FIG. 1. Further, in certain implementations, the functionality of the driving analysis computers, such as storing and analyzing driver data, vehicle data, driving data and driving behaviors, road segment sensor data, and determining or evaluating road segment conditions to determine road segment characteristics, route risk ratings, and the like, may be performed in a central road segment evaluation server 350 rather than by the individual vehicle 310 or personal mobile device 330. In such implementations, the vehicle 310 and and/or mobile device 330, might only collect and transmit driver data, sensor data, and the like to road segment evaluation server 350, and thus the vehicle-based driving/road segment analysis computer 314 may be optional.

The system 300 also may include one or more road segment evaluation servers 350, containing some or all of the hardware/software components as the computing device 101 depicted in FIG. 1. The road segment evaluation server 350 may include hardware, software, and network components to receive driver data, vehicle data, and vehicle operational data/driving data from one or more vehicles 310, mobile devices 330, and other data sources, as well as road segment sensor data from one or more road segment sensors 318, mobile devices 330, and other data sources. The road segment evaluation server 350 may include a road segment database 352 and road segment rating system 351 to respectively store and analyze driver data, vehicle data, sensor data, and driving data, etc., received from vehicle 310, mobile device 330, road segment sensors 318, and other data sources. In some examples, the road segment rating system 351 may include many or all of the components of the road segment evaluation system 200 described with respect to FIG. 2.

The road segment evaluation server 350 may initiate communication with and/or retrieve driver data, vehicle data, road segment sensor data and driving data from vehicle 310 wirelessly via telematics device 313, mobile device 330, or by way of separate computing systems over one or more computer networks (e.g., the Internet). Additionally, the road segment evaluation server 350 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the road segment database 352 may be organized in any of several different manners. For example, a road segment table may contain data related to features of the road segment, historical accident data for each road segment, historical rating data for each road segment, and the like. Other tables in the database 352 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The road segment rating system 351 within the road segment evaluation server 350 may be configured to retrieve data from the database 352, or may receive driver data, road segment sensor data, vehicle data, and driving trip directly from vehicle 310, mobile device 330, road segment sensors 318, or other data sources, and may perform road segment evaluation analyses, determine characteristics of a road segment, determine an overall rating for a route, and other related functions. The functions performed by the road segment rating system 351 may be performed by specialized hardware and/or software separate from the additional functionality of the road segment evaluation server 350. Such functions may be similar to those of driving/road segment analysis module 314 of vehicle 310, and the road segment analysis application 334 of mobile device 330, and further descriptions and examples of the algorithms, functions, and analyses that may be executed by the road segment rating system 351 are described herein.

In various examples, the road segment analyses and determinations may be performed entirely in the road segment evaluation server 350, may be performed entirely in the vehicle-based driving/road segment analysis computing module 314, or may be performed entirely in the road segment analysis application 334 of mobile device 330. In other examples, certain analyses of driver data, road segment sensor data, vehicle data, and driving trip data, may be performed by vehicle-based devices (e.g., within driving/road segment analysis device 314) or mobile device 330 (e.g., within application 334), while other data analyses are performed by the road segment rating system 351 at the road segment evaluation server 350. For example, a vehicle-based driving/road segment analysis computer 314, or the hardware and software components of mobile device 330 may continuously receive and analyze driver data, road segment sensor data, vehicle data, driving trip data, and the like to determine road segment characteristics so that large amounts of data need not be transmitted to the road segment evaluation server 350. Additionally or alternatively, the road segment evaluation server may receive data from the road segment sensors 318, vehicle based sensors, and other data sources, and may evaluate road segments and transmit the outcome to a computing device of a user. Various other combinations of devices processing data may be used without departing from the invention.

As discussed herein, road segment sensors 318 may include various types of sensors. For instance, road segment sensors 318 may include sensors to detect temperature, pressure, moisture, road treatments, and the like. The road segment sensors 318 may be physically placed or embedded in the road segment at various intervals in order to collect and transmit data to evaluate road segment conditions. In some examples, a number of road segment sensors 318 along a particular road segment may be determined based on features of the road segment. Accordingly, the number of road segment sensors determined may include a particular number of a certain type of sensor (e.g., a particular number of temperature sensors, a particular number of moisture sensors, and the like). Additionally or alternatively, sensors for detecting different conditions may be contained within a single housing, such that the determined number of sensors for distribution along a road segment may include X number of sensor, each with the capability to detect one or more different conditions (e.g., each sensor may include a temperature sensor, a pressure sensor, etc.).

Figure 4:
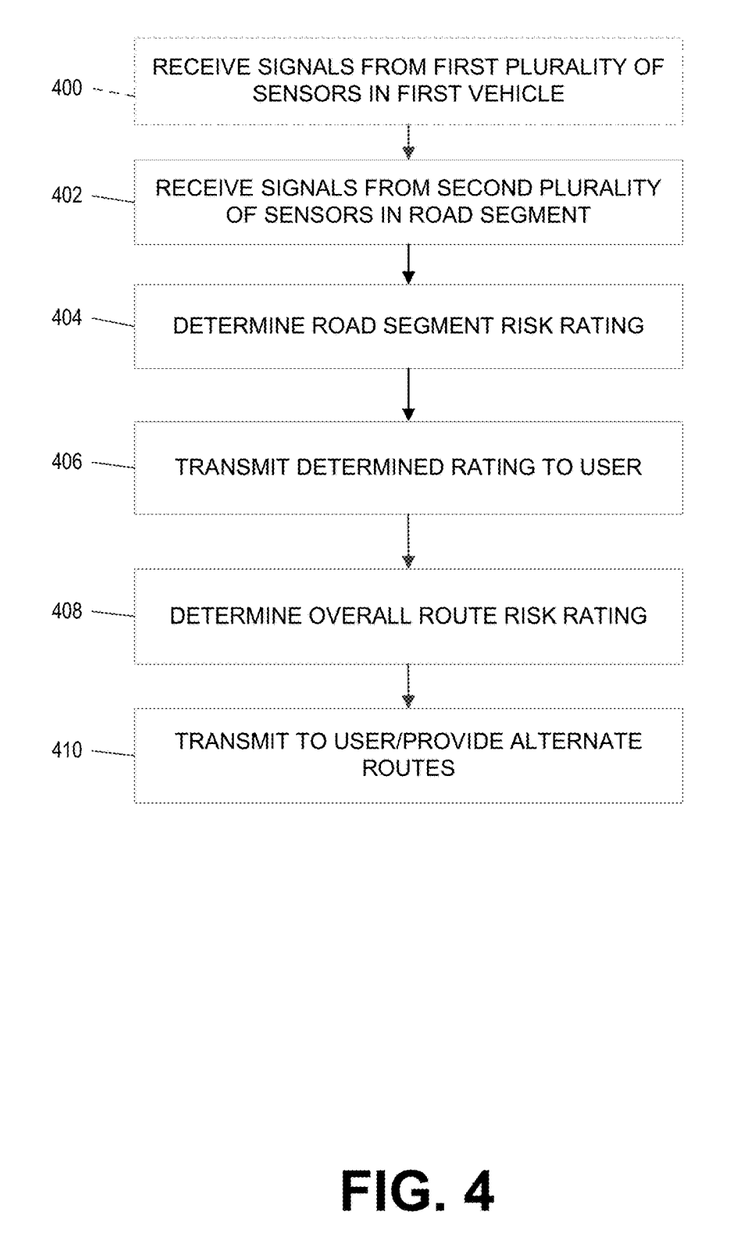
FIG. 4 is a flow diagram illustrating an example method of determining a road segment rating based on data received from one or more road segments according to one or more aspects described herein.

FIG. 4 is a flow chart illustrating one example method of determining a road segment rating based on received data. The process may, in some examples, begin at optional step 400 in which data from one or more vehicle sensors may be received. For instance, data related to vehicle operation (e.g., braking, acceleration, speed, etc.) may be received. In some examples, this data might not be used in determining a road segment rating and, thus, step 400 may be omitted in at least some examples. However, in arrangements in which vehicle operational data is also used to determine a rating, the vehicle operational data may permit the rating to be customized to a particular user. For instance, data associated with acceleration, braking, turning, and the like, of a particular user, may be aggregated with road segment sensor data to determine a rating for a road segment particular to the user based on the user's driving behaviors as well as the road segment data.

In step 402, signals may be received from one or more road segment sensors (such as sensors 318 in FIG. 3, 218a, 218b in FIG. 2). The signals received may include data related to temperature, pressure, moisture, weight, traffic volume, etc. In some examples, the data may include image or video data, or other types of data, indicating pedestrian traffic along the road segment.

In step 404, a rating for the road segment may be determined. In some examples, the road segment rating may be determined in real-time or near real time and may provide an indication of current characteristics or conditions of the road segment. The road segment rating may be determined from, in some examples, the data received from road segment sensors. In some examples, only the data received from road segment sensors may be used to evaluate the road segment. In other examples, the road segment sensor data may be aggregated with driving data, historical data such as accident data, publicly available data such as speed limit data, weather data, and the like. Accordingly, a condition of the road segment may be determined and, this information may be transmitted to one or more users in step 406.

In some examples, transmitting the rating to the user may include transmitting the road segment rating to a computing device of a user (e.g., mobile device 330, on-board vehicle computing device, etc.). In some examples, the road segment rating may be transmitted to users within a predefined distance of the road segment (e.g., users within 1 mile, 2 miles, or the like) may receive a notification of the rating of the road segment. In other examples, the road segment rating may be transmitted to users who have the rated road segment along a route that are travelling (as determined by a predetermined destination, driving patterns, or the like).

In step 408, an overall route risk rating may be determined for one or more users. The overall route risk rating may be determined by, for example, summing a road segment rating for each road segment along a route.

In step 410, the overall route risk rating may be transmitted to a user and, in some examples, may include recommendations for an alternate route (e.g., a route having a safer risk rating). For instance, if data from road segment sensors indicates that the road segment may be icy (e.g., moisture is present, temperature is below freezing, etc.), the road segment may be deemed risky and rated as such. Accordingly, an alternate road segment may be suggested that road segment sensor data indicates has been treated for ice.

Figure 5:
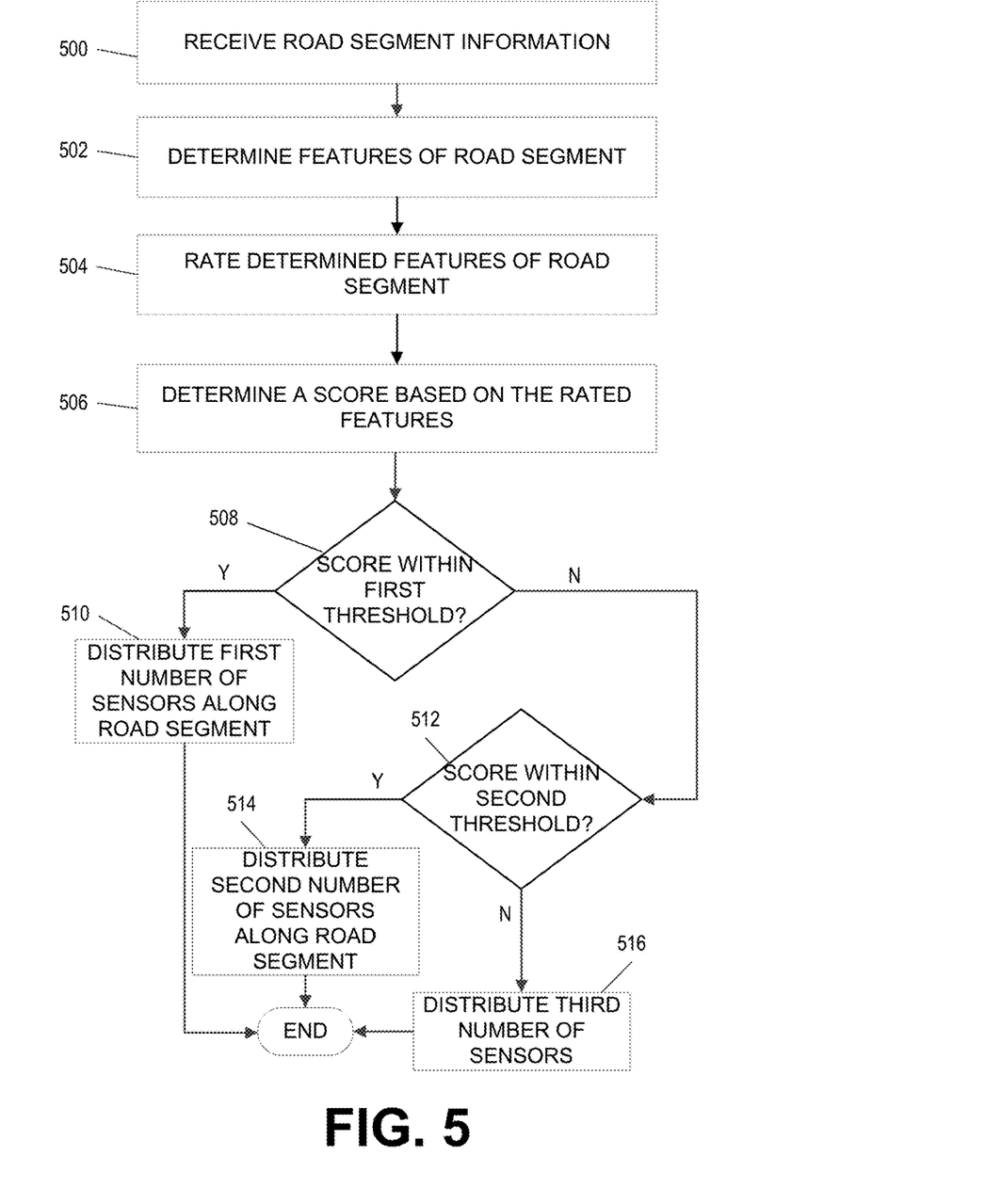
FIG. 5 is a flow diagram illustrating an example method of determining a number of road segment sensors to distribute in a road segment according to one or more aspects described herein.

FIG. 5 is a flow chart illustrating one example of determining a number of road segments sensors to distribute along a road segment according to one or more aspects described herein. In step 500, road segment information may be received. For instance, information related to a length of the road segment, curvature of the road segment, speed limit of the road segment, and the like, may be received. In some examples, historical information related to accidents that occurred on the road segment may be received. Further, information related to historical weather data along the road segment, location of the road segment, and the like may be received.

In step 502, one or more features of the road segment may be determined. The features may include identifying, from the data received, a particular curvature of the road segment or portion thereof, lighting on the road segment (or lack thereof), traffic volume, location information, and/or accident history may be identified for the particular road segment. In step 504, each of the identified features of the road segment may be scored. For instance, as discussed above, each feature may be scored on a scale of, for example, 1 to 10, 1 to 100, or the like. The feature score for each feature of the road segment may indicate a level of risk associated with that feature. For instance, dimly lit roads may increase a driving risk. Accordingly, if the road segment feature "lighting" is identified as having limited or no lighting for night time driving, that feature may be given a riskier score (e.g., high or low depending on the scale) than a well-lit road segment.

In step 506, an overall road segment feature score may be determined from the feature scores identified for each road segment feature. For example, the scores for each road segment feature may, in some arrangements, be summed to determine an overall road segment feature score for the road segment. The overall road segment feature score may be used to identify a number, placement, or the like, of road segment sensors along the road segment.

In step 508, a determination is made as to whether the overall road segment feature road segment score is within first threshold. If so, a first number of sensors may be identified for distribution along the road segment (and/or distributed along the road segment) in step 510. If not, a determination may be made in step 512 as to whether the overall road segment feature score is within a second predefined threshold different from the first predefined threshold. If so, a second number of sensors different from the first number of sensors may be identified for distribution along the road segment (and/or distributed along the road segment) in step 514.

If, in step 512, the overall road segment feature score is not within the second predefined threshold, then, in step 516, a third number of sensors different from the first number of sensors and second number of sensors may be identified for distribution along the road segment (and/or distributed along the road segment).

Figure 6:
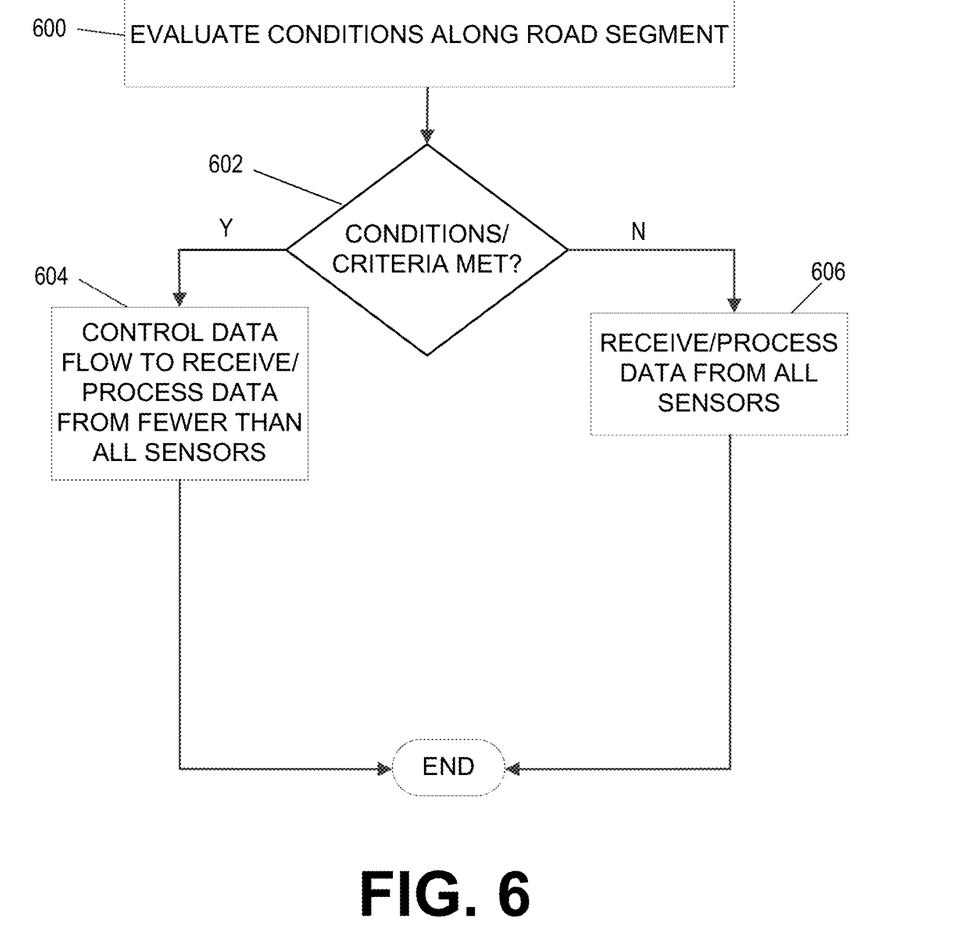
FIG. 6 is a flow diagram illustrating an example method of controlling data received and/or processed from road segment sensors according to one or more aspects described herein.

FIG. 6 is a flow chart illustrating one example of controlling an amount of data received and/or processed based on road segment conditions, according to one or more aspects described herein. As discussed above, in some examples, an amount of data received and/or processed from the road segment sensors may be controlled based on current conditions along the road segment. For instance, in fair weather during the day and with temperatures well above-freezing (e.g., as determined from one or more data sources and/or from one or more road segment sensors), the conditions of the road segment are likely to be relatively stable. Accordingly, in order to reduce the resources necessary to process data from the sensors (e.g., computing resources) the data received from the sensors and/or processed by one or more devices may be controlled such that data from fewer than all sensors is received and/or processed.

For instance, in step 600, conditions along the road segment may be evaluated. In some examples, evaluating the conditions may include evaluating weather conditions, temperature, moisture, precipitation, forecast precipitation, time of day (e.g., level of daylight) and the like. This information may be received by one or more computing devices of the system (e.g., road segment evaluation system 200, road segment evaluation server 350, mobile device 330, or the like) from, for instance, one or more data sources. In some examples, the one or more data sources may include publicly available weather data, data from one or more road segment sensors along the road segment, and the like.

In step 602, the system may determine whether the evaluated conditions may certain criteria. For instance, in one example, if the temperature is above fifty degrees Fahrenheit and there is no moisture or precipitation detected, it is not likely that the road segment will be frozen or icy. Accordingly, the data received may be throttled to conserve resources (e.g., data may be received from fewer than all sensors and/or less than all data received may be processed). Alternatively, if the temperature is at or below freezing and moisture is detected, it is possible or even likely that the road segment may be icy, thereby increasing the risk of driving along that roadway. Because of this potential increased risk, the system may receive and/or process data from all sensors in order to accurately evaluate the conditions along the road segment.

Criteria for throttling an amount of data received and/or processed may vary as desired. In some examples, the criteria may include temperature, moisture, road treatments detected, time of day, forecast weather conditions, and the like.

If, in step 602, the conditions meet the criteria to receive and/or process less than all available data, the data may be throttled in step 604. If the criteria are not met, the system may receive and/or process data from all available sensors in step 606.

Figure 7A:
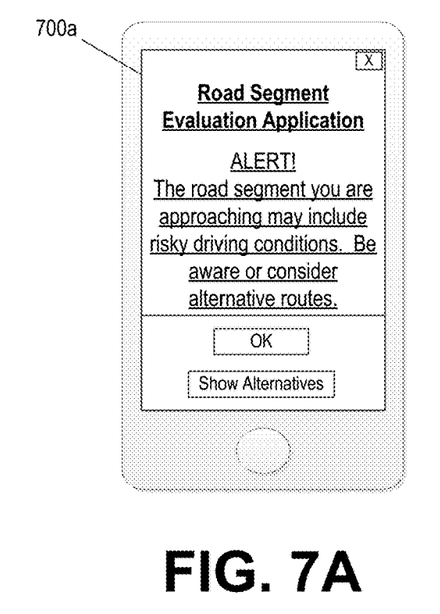
FIGS. 7A and 7B are example user interfaces for providing notifications to a user according to one or more aspects described herein.
Figure 7B:
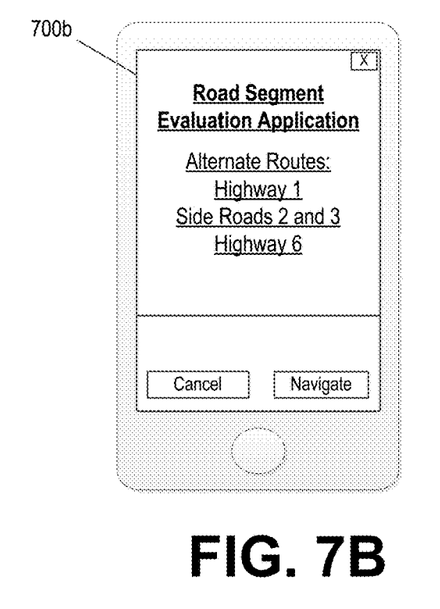

FIGS. 7A and 7B illustrate example user interfaces that may be displayed to a user to communicate a road segment rating and/or recommended alternate routes according to one or more aspects described herein. FIG. 7A illustrates one example user interface 700a that provides a notification to a user that the road segment that a road segment the driver is approaching may include hazardous or risky driving conditions (e.g., as determined from, for example, one or more road segment sensors and/or other data). The interface may be provided to a user on a mobile device of the user, on-board vehicle computing device, or other device.

In some examples, the interface 700a may include an "OK" option which may clear the notification. The interface may also include an option to display alternative routes. Selection of "Show Alternatives" option may prompt display of interface 700b shown in FIG. 7B. The interface 700b provides one or more alternate routes that may avoid the road segment identified as high risk. A user may select one or more of the alternative routes provided, as desired. The user may then select "Navigate" option to enable a navigation system to provide instructions to use the alternate route. Otherwise, a user may select to cancel the alternatives provided.

The arrangements described herein provide efficient and accurate systems, etc. for evaluating current conditions of a road segment. As discussed herein, road segment data received from one or more sensors in a road segment may be evaluated in real-time or near real-time to assess or rate a road segment (e.g., for safety). This may aid in determining road segment conditions such as icing, moisture, debris in the road, potholes, bumps or heaving of the road segment surface, road segment surface treatments, and the like.

The arrangements described herein may also be used to corroborate data collected by a vehicle, mobile device, or other computing device having a plurality of sensors monitoring conditions. The data collected may also be used to aid in determining fault in an accident that occurred along the road segment. That is, conditions prior to, during, and after an incident may be recorded by the road segment sensors and the data may be used to evaluate fault, process insurance claims, and the like.

In still other examples, the road segment data received from the one or more sensors may be used to improve safety for pedestrians along the road segment. That is, upon detection of one or more pedestrians along the road segment, a notification of presence of pedestrians may be transmitted to nearby vehicles. In another example, a dynamic speed limit for the road segment may be reduced while the pedestrians are present.

In still another example, aspects described herein may be used in an interior of a building or other structure. For instance, one or more sensors may be distributed along a walkway of a building or other structure to aid in detecting obstacles, potential obstacles, or other perils that may pose a threat to a pedestrian. This information may be communicated to one or more pedestrians, such as via a personal mobile device.

Various aspects described herein may also be used by cyclists to determine a risk associated with one or more road segments. Sensor data from one or more road segments may be evaluated to determine a risk to a cyclist associated with the road segment (e.g., icy conditions, rain, etc.). This information may then be transmitted to a cyclist via a mobile computing device (e.g., smartphone, bicycle computer, or the like).

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A road segment evaluation system, comprising:
   a first plurality of sensors arranged in a road segment, the first plurality of sensors configured to detect conditions of the road segment, wherein a number of sensors in the first plurality of sensors is determined based on features of the road segment;
   a road segment evaluation server, including:
      at least one processor; and
      at least one memory storing computer-executable instructions that, when executed by the at least one processor, cause the road segment evaluation server to:
         receive first electronic signals from the first plurality of sensors arranged on the road segment; and
         process the first electronic signals to determine a risk rating of the road segment.

2. The road segment evaluation system of claim 1, further including a vehicle having a second plurality of sensors arranged thereon, the second plurality of sensors being configured to detect vehicle operational data.

3. The road segment evaluation system of claim 2, the road segment evaluation server further including instructions that, when executed, cause the road segment evaluation server to:
   receive second electronic signals from the second plurality of sensors;
   process the second electronic signals; and
   determine a risk rating of the road segment based on the processed first electronic signals and second electronic signals.

4. The road segment evaluation system of claim 1, the road segment evaluation server further including instructions that, when executed, cause the road segment evaluation server to:
   determine the number of sensors arranged in the road segment based on features of the road segment by:
      receiving data associated with the road segment;
      identifying one or more features of the road segment from the received data;
      evaluate each identified feature of the road segment to determine a feature score for each feature of the road segment;
      sum the determined feature scores for each feature of the road segment to determine an overall road segment feature score for the road segment;
      determine whether the overall road segment feature score is within a first threshold;
      responsive to determining that the overall road segment feature score is within the first threshold, determining a first number of sensors to arrange in the road segment;
      responsive to determining that the overall road segment feature score is not within the first threshold, determine whether the overall road segment feature score is within a second threshold;
      responsive to determining that the overall road segment feature score is within the second threshold, determining a second number of sensors to arrange in the road segment, the second number of sensors being different from the first number of sensors; and
      responsive to determining that the overall road segment feature score is not within the second threshold, determining a third number of sensors to arrange in the road segment, the third number of sensors being different from the first number of sensors and the second number of sensors.

5. The road segment evaluation system of claim 1, wherein the first electronic signals are processed in real-time.

6. The road segment evaluation system of claim 1, the road segment evaluation server further including instructions that, when executed, cause the road segment evaluation server to:
   receive data associated with conditions of the road segment;
   determine whether road segment condition criteria are met;
   responsive to determining that road segment condition criteria are met, receiving and processing data from fewer sensors than all sensors in the first plurality of sensors; and
   responsive to determining that road segment condition criteria are not met, receiving and processing data from all sensors in the first plurality of sensors.

7. The road segment evaluation system of claim 6, wherein the road segment condition criteria include at least one of: minimum temperature and no presence of moisture.

8. A road segment evaluation system, comprising:
   a first plurality of sensors arranged in a road segment, the first plurality of sensors configured to detect conditions of the road segment, wherein a number of sensors in the first plurality of sensors is determined based on features of the road segment;
   a road segment evaluation server, including:
      at least one processor; and
      at least one memory storing computer-executable instructions that, when executed by the at least one processor, cause the road segment evaluation server to:
         receive first electronic signals from the first plurality of sensors arranged on the road segment; and
         process the first electronic signals to determine a risk rating of the road segment; and
   an on-board vehicle computing device including:
      at least one processor; and
      at least one memory storing computer-readable instructions that, when executed by the at least one processor, cause the on-board vehicle computing device to:
         receive, from the road segment evaluation server, the risk rating of the road segment; and
         provide, via a display of the on-board vehicle computing device, a notification of the risk rating of the road segment.

9. The road segment evaluation system of claim 8, further including a vehicle having a second plurality of sensors arranged thereon, the second plurality of sensors being configured to detect vehicle operational data.

10. The road segment evaluation system of claim 9, the road segment evaluation server further including instructions that, when executed, cause the road segment evaluation server to:
receive second electronic signals from the second plurality of sensors;
process the second electronic signals; and
determine a risk rating of the road segment based on the processed first electronic signals and second electronic signals.

11. The road segment evaluation system of claim 8, the road segment evaluation server further including instructions that, when executed, cause the road segment evaluation server to:
determine the number of sensors arranged in the road segment based on characteristics of the road segment by:
receiving data associated with the road segment;
identifying one or more features of the road segment from the received data;
evaluate each identified feature of the road segment to determine a feature score for each feature of the road segment;
sum the determined feature scores for each feature of the road segment to determine an overall road segment feature score for the road segment;
determine whether the overall road segment feature score is within a first threshold;
responsive to determining that the overall road segment feature score is within the first threshold, determining a first number of sensors to arrange in the road segment;
responsive to determining that the overall road segment feature score is not within the first threshold, determine whether the overall road segment feature score is within a second threshold;
responsive to determining that the overall road segment feature score is within the second threshold, determining a second number of sensors to arrange in the road segment, the second number of sensors being different from the first number of sensors; and
responsive to determining that the overall road segment feature score is not within the second threshold, determining a third number of sensors to arrange in the road segment, the third number of sensors being different from the first number of sensors and the second number of sensors.

12. The road segment evaluation system of claim 8, wherein the first electronic signals are processed in real-time.

13. The road segment evaluation system of claim 8, the road segment evaluation server further including instructions that, when executed, cause the road segment evaluation server to:
receive data associated with conditions of the road segment;
determine whether road segment condition criteria are met;
responsive to determining that road segment condition criteria are met, receiving and processing data from fewer sensors than all sensors in the first plurality of sensors; and
responsive to determining that road segment condition criteria are not met, receiving and processing data from all sensors in the first plurality of sensors.

14. The road segment evaluation system of claim 13, wherein the road segment condition criteria include at least one of: minimum temperature and no presence of moisture.

15. A method of determining a road segment rating, comprising:
determining, by a road segment evaluation server, a number of sensors in a first plurality of sensors to be arranged in a road segment based on features of the road segment, determining the number of sensors including:
receiving data associated with the road segment;
identifying one or more features of the road segment from the received data;
evaluating each identified feature of the road segment to determine a feature score for each feature of the road segment;
summing the determined feature scores for each feature of the road segment to determine an overall road segment feature score for the road segment;
determining whether the overall road segment feature score is within a first threshold;
responsive to determining that the overall road segment feature score is within the first threshold, determining a first number of sensors to arrange in the road segment;
responsive to determining that the overall road segment feature score is not within the first threshold, determining whether the overall road segment feature score is within a second threshold;
responsive to determining that the overall road segment feature score is within the second threshold, determining a second number of sensors to arrange in the road segment, the second number of sensors being different from the first number of sensors;
responsive to determining that the overall road segment feature score is not within the second threshold, determining a third number of sensors to arrange in the road segment, the third number of sensors being different from the first number of sensors and the second number of sensors;
receiving, by the road segment evaluation server and from the first plurality of sensors arranged in the road segment, data related to conditions of the road segment detected by the first plurality of sensors; and
processing, by the road segment evaluation server, the received data to determine a risk rating of the road segment.

16. The method of claim 15, further including:
receiving, by the road segment evaluation server and from a second plurality of sensors arranged on a vehicle, vehicle operational data.

17. The method of claim 16, further including:
processing, by the road segment evaluation server, the received vehicle operational data; and
determining the risk rating of the road segment based on the processed received data and the processed vehicle operational data.

18. The method of claim 15, wherein the received data is processed in real-time.

19. The method of claim 15, further including:
receiving data associated with conditions of the road segment;
determining whether road segment condition criteria are met;

responsive to determining that road segment condition criteria are met, receiving and processing data from fewer sensors than all sensors in the first plurality of sensors; and responsive to determining that road segment condition criteria are not met, receiving and processing data from all sensors in the first plurality of sensors.

20. The method of claim 19, wherein the road segment condition criteria include at least one of: minimum temperature and no presence of moisture.

* * * * *

UNITED STATES PATENT AND TRADEMARK OFFICE
CERTIFICATE OF CORRECTION

| | | |
|---|---|---|
| PATENT NO. | : 10,395,526 B1 | Page 1 of 1 |
| APPLICATION NO. | : 15/346214 | |
| DATED | : August 27, 2019 | |
| INVENTOR(S) | : Mark Slusar | |

It is certified that error appears in the above-identified patent and that said Letters Patent is hereby corrected as shown below:

In the Specification

Column 7, Detailed Description, Lines 38-39:
Delete "216a, 216b 218a, 218b)." and Insert --216a, 216b, 218a, 218b).--

Column 12, Detailed Description, Line 38:
Delete "321," and Insert --332,--

Column 12, Detailed Description, Line 48:
Delete "321" and Insert --332--

Signed and Sealed this
Seventeenth Day of November, 2020

Andrei Iancu
*Director of the United States Patent and Trademark Office*